(No Model.)

H. UNZICKER.
AUTOMATIC FRICTION CLUTCH.

No. 284,689. Patented Sept. 11, 1883.

Witnesses
Adam Geo. White
Louis Nolting

Inventor
Herman Unzicker
By Wm H Lotz
Attorney

UNITED STATES PATENT OFFICE.

HERMAN UNZICKER, OF CHICAGO, ILLINOIS.

AUTOMATIC FRICTION-CLUTCH.

SPECIFICATION forming part of Letters Patent No. 284,689, dated September 11, 1883.

Application filed July 9, 1883. (No model.)

*To all whom it may concern:*

Be it known that I, HERMAN UNZICKER, a subject of the Emperor of Germany, residing at Chicago, in the county of Cook and State of Illinois, have invented certain new and useful Improvements in Automatic Friction-Clutches, of which the following is a specification, reference being had therein to the accompanying drawings.

This invention relates to devices for intermittently coupling a pulley, hoisting-drum, or wheel to turn with the shaft upon which it is loosely sleeved, and it is designed for clutch-couplings, hoisting-machines, pile-drivers, drop-hammers, &c.; and it is my object to produce a simple device that will automatically couple the parts very rigidly, and that with very little force on the part of the operator can be readily disconnected.

My invention therefore consists of the novel devices and combinations of devices hereinafter described and specifically claimed.

Figure 1:
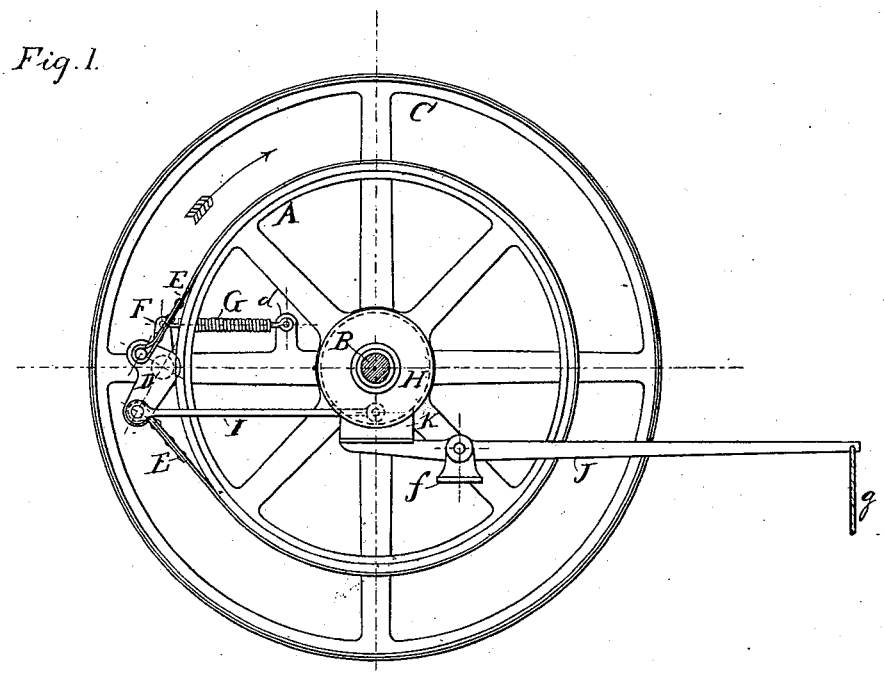
Figure 2:
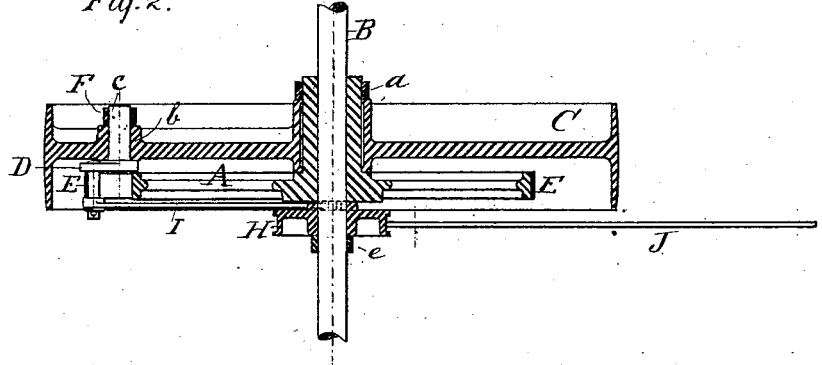

In the drawings, Figure 1 represents an elevation, and Fig. 2 a cross-section, through the center of my improved coupling device.

Corresponding letters in the several figures of the drawings designate like parts.

A denotes the driving-wheel, mounted on shaft B, and keyed to be rigid therewith, so as to revolve with it in the direction indicated by the arrow. The hub of wheel A is turned to be concentric with the shaft, and upon this is sleeved the hub of pulley C, to turn loose thereon, which hub is laterally held in position by a collar, $a$. Into the eye of a hub, $b$, that is formed to one of the arms of pulley C, is fitted the trunnion $c$ of a bell-crank, D, that has arms of different lengths, to the ends of which are pivotally connected the ends of a strap, E. This strap E embraces the wheel A, and is tightened upon such wheel in the manner of a brake-strap by turning the long arm of bell-crank D toward the radial line, and it looses its frictional hold around such wheel A by turning the long arm of bell-crank D toward the tangential line of wheel A. The wheel A turning in the direction indicated by the arrow, the least friction of strap E against the face of wheel A will tend to turn such bell-crank in the direction that will cause its differential arms to tighten such strap E upon wheel A with a force increasing with the working load carried by pulley C, so as to take a rigid hold thereon.

For the purpose of insuring immediate action of the differential tightening-strap in cases where, on account of the weight or stiffness of strap E, the automatic closing of such strap upon pulley A cannot be relied upon sufficiently, I mount a small crank, F, upon the rearwardly-projecting end of trunnion $c$ of bell-crank D, and I connect such crank by a spring, G, with a lug, $d$, of the pulley-arm, such spring tending to turn the bell-crank D in the direction to tighten the strap E upon wheel A, which then by its friction thereon will grasp such wheel rigidly.

An auxiliary or brake wheel, H, is loosely sleeved upon shaft B, with its hub butting against the hub of wheel A, and is laterally held in position by a collar, $e$. This wheel H has a crank-pin to one side, that has coupled one end of a rod, I, the opposite end of which is coupled to the end of the long arm of bell-crank D. A lever, J, is pivoted in a bracket, $f$, that is rigidly fixed upon the frame-work below wheel H, and upon its short end this lever J has secured a brake-shoe, K, while the extremity of its longer end may either be formed a handle, or may be provided with an eye for coupling a rod or rope, $g$, by which to operate such lever. With depressing the lever, so as to tighten the brake-shoe against wheel H, such wheel is checked in its motion, when rod I will pull the long arm of bell-crank D toward the tangential line, and will thereby expand the strap E to release its hold on wheel A, causing the pulley C to stop until such brake-shoe K is released from the auxiliary wheel A again.

With this device a very powerful friction-coupling is produced, that will automatically form a rigid connection between the driving-shaft and the driven wheel, and that with a very light force applied will be caused to release its connection.

In place of the brake-shoe K for retarding the wheel H, a strap or any other form of brake may be applied, and the strap E may be made of two or more sections hinged together, or to two or more differential levers, D, and one or several springs, G, may be applied in any suitable manner for tightening the strap E.

I am aware of the existence of Letters Patent No. 120,527, issued on the 31st day of October, 1871, to R. D. Napier, for improvements in differential brakes, and therefore do not claim the invention therein referred to; but

What I claim is—

1. The combination, with an automatic differential brake-coupling, of an auxiliary wheel provided with a brake and connected with the differential lever of such coupling, as and for the purpose set forth.

2. In a friction-coupling, the wheel A, rigidly mounted upon shaft B, and the loose pulley C, having differential lever D and strap E, in combination with auxiliary wheel H, connected by rod I with the long arm of such differential lever D, and provided with a brake, all constructed and arranged substantially as described, to operate as specified.

3. In a friction-coupling, the shaft B, having mounted the rigid wheel A and loose pulley C, that has differential lever D and strap E, in combination with the auxiliary wheel H, connected by rod I with the long arm of such differential lever D, and being operated by lever J, with brake-shoe K, substantially as and for the purpose described and shown.

4. In a friction-coupling, the shaft B, having mounted rigid wheel A and loose pulley C, that is provided with differential lever D, strap E, and spring G, in combination with the auxiliary wheel H, arranged to be operated by a brake, and being connected with the differential lever, all constructed and arranged substantially as and for the purpose set forth.

In testimony whereof I affix my signature in presence of two witnesses.

HERMAN UNZICKER.

Witnesses:
ADAM GEO. WHITE,
LOUIS NOLTING.